United States Patent

[11] 3,552,253

[72] Inventor Thomas J. MacDonald
 Elmhurst, Ill.
[21] Appl. No. 755,256
[22] Filed Aug. 26, 1968
[45] Patented Jan. 5, 1971
[73] Assignee Am Forge, Inc.
 Chicago, Ill.
 a corporation of Illinois

[54] BAR SHEAR APPARATUS
 7 Claims, 5 Drawing Figs.

[52] U.S. Cl................................................. 83/372,
 83/524, 83/527, 83/639, 83/198; 91/38, 91/426,
 91/461
[51] Int. Cl..................................................... B26d 5/38,
 B26d 5/08, B26d 1/10
[50] Field of Search......................................... 83/372,
 639, 524, 390; 91/461, 426, 38, 527

[56] References Cited
UNITED STATES PATENTS
2,788,070 4/1957 Seabury II et al......... 83/639
3,170,376 2/1965 Cudnohufsky.............. 91/461

Primary Examiner—Andrew R. Juhasz
Assistant Examiner—Leon Gilden
Attorney—Gary, Parker, Juettner, Pigott & Cullinan ABSTRACT: Apparatus for shearing steel bar stock and the like including improved means for removably mounting a cutter block member to a power ram and means for controlling the stroke of the ram through use of an electrical timing device.

Inventor:
Thomas J. MacDonald
By Gary, Parker,
Juettner, Pigott & Cullinan
Atty's

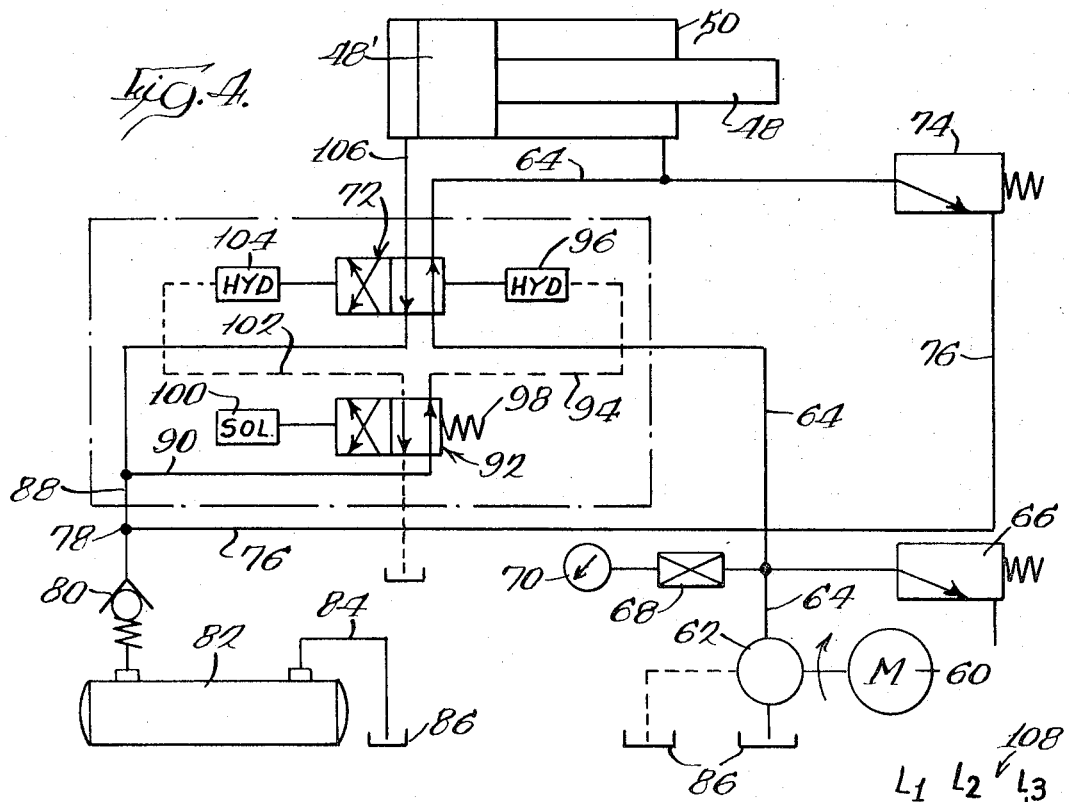
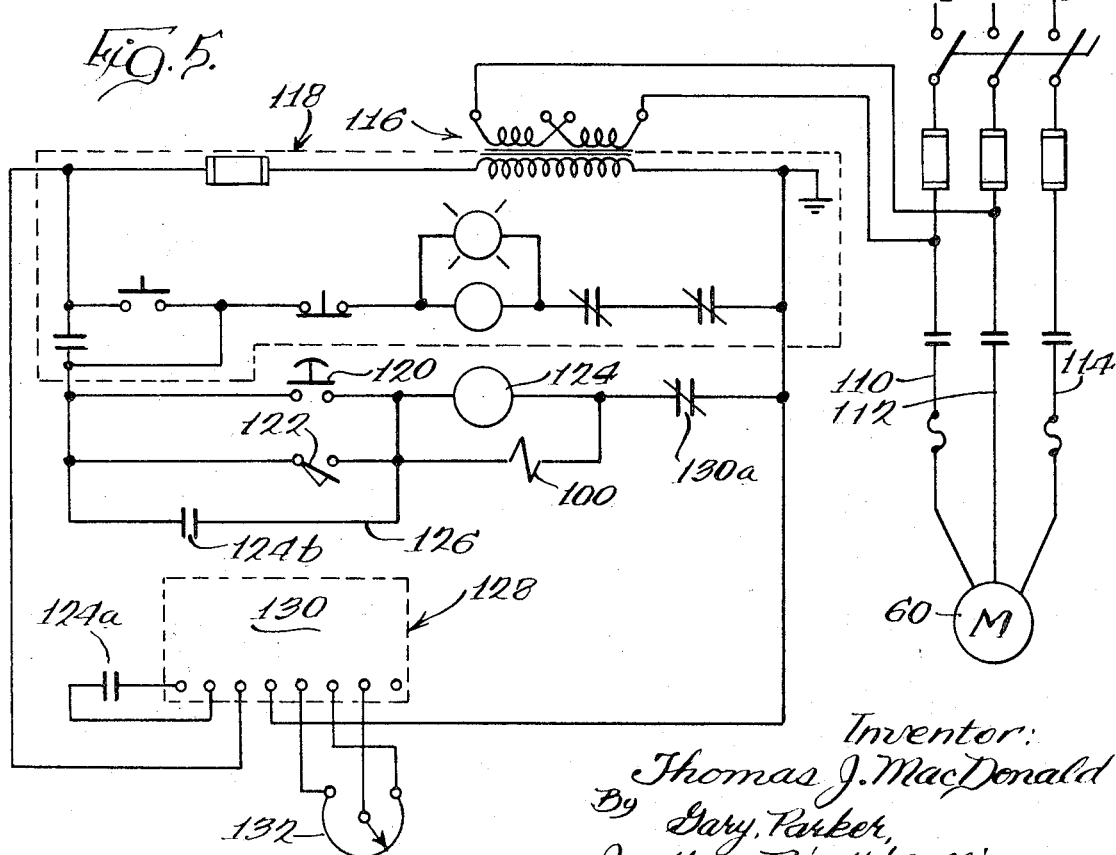

3,552,253

BAR SHEAR APPARATUS

BRIEF SUMMARY OF THE INVENTION

Machines for shearing bar stock commonly comprise a pair of shear or cutter blocks one of which is mounted in a stationary manner and the other of which is movable by means of a hydraulically actuated ram. Each of the two shear blocks is provided with an opening to receive a length of bar stock to be sheared. The two shear blocks are initially positioned with their openings in alignment with one another, and bar stock to be sheared is positioned so as to project therethrough. Subsequent movement of one of the two cutter blocks through a predetermined stroke by means of the power ram will then effect shearing of the bar stock.

It will be understood that the optimum stroke of the hydraulically operated ram and the movable shear block is dependent upon the diameter of the bar stock to be sheared. Generally speaking, the desired stroke of the movable shear block is approximately equal to one-third the diameter of the bar stock to be sheared. If the stroke of the movable shear block is too short, then a complete shear of the bar stock material may not be effected. On the other hand, if the stroke is set for too great a distance, it will of course shear the bar stock but it will also often cause undesirable deformation of the bar stock. Accordingly, it is important to provide bar shear apparatus having means which readily permits accurate adjustment of the stroke of the power ram member.

Heretofore, it has been common to provide various types of plunger members which are physically engaged by the ram or move with the ram and in turn actuate a limit switch for the purpose of controlling the power stroke of the ram. Such devices can be adjusted by changing the position of the limit switch. However, this is a rather inconvenient procedure.

Another operation which must be carried out when preparing the bar shear apparatus for use with a particular size of bar stock is to mount shear blocks having the proper size opening therein on the apparatus, with one such shear block being mounted for movement by a hydraulically actuated ram through a power stroke. It has been common heretofore to bolt the movable shear blocks directly to the ram, but when this procedure is followed it becomes a difficult and time-consuming task to change the shear blocks when a different size of bar stock material is to be sheared.

It is a general object of the present invention to provide improved bar shearing apparatus which overcomes the disadvantages of known devices as described above.

A more specific object of the present invention is to provide an improved means for accurately controlling the stroke of the power ram component of bar shear apparatus through use of electrical timing means which is readily adjustable for any desired time.

Still another of my objects is to provide bar shear apparatus having improved means for associating a movable shear block with a power ram member so as to facilitate removal of the shear block and substitution of another shear block of a different type or size.

The foregoing and other objects and advantages of the invention will be apparent from the following description thereof.

Now, in order to acquaint those skilled in the art with the manner of making and using my invention, I shall describe, in conjunction with the accompanying drawings, a preferred embodiment of the invention.

DESCRIPTION OF THE DRAWINGS

FIG. 4 is a schematic diagram of the hydraulic circuit for the present invention; and FIG. 5 is a schematic electrical wiring diagram.

DETAILED DESCRIPTION OF THE INVENTION

Figure 1:
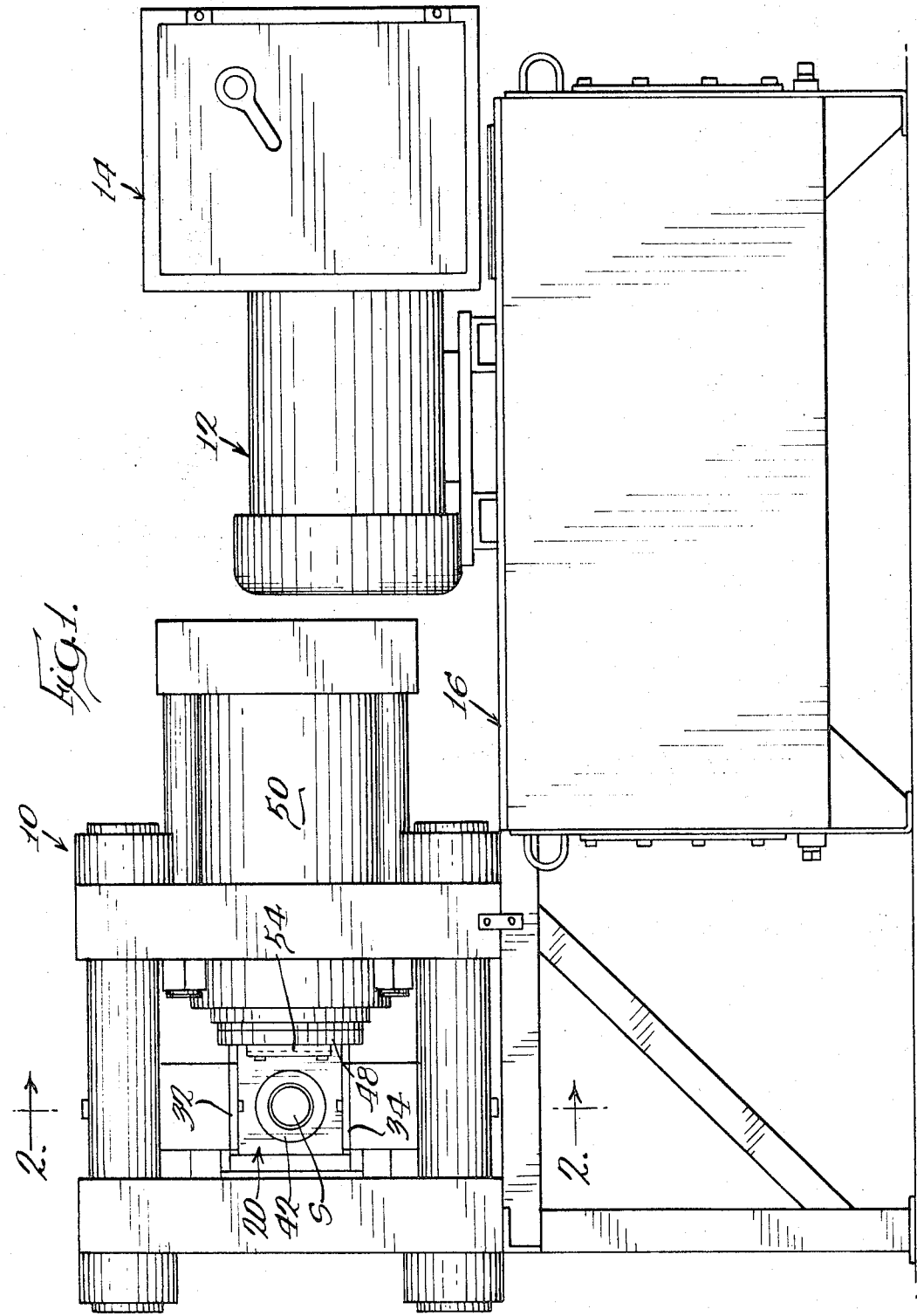
FIG. 1 is an elevational view of a bar shear machine constructed in accordance with the present invention.
Figure 2:
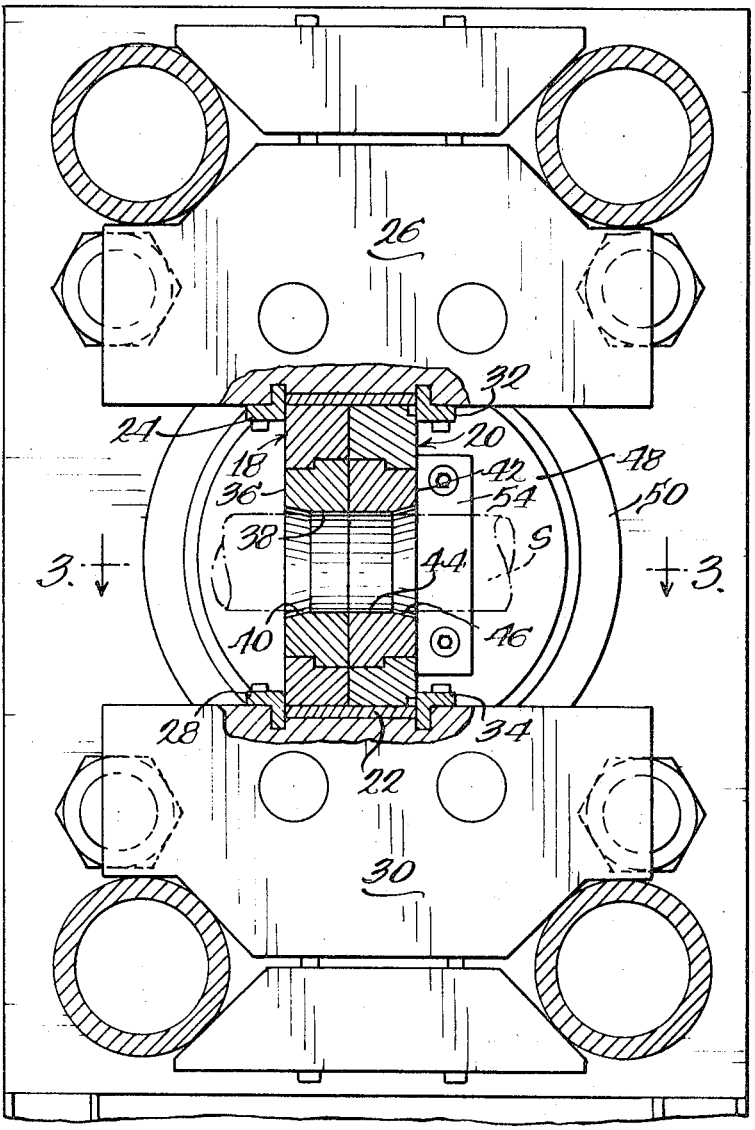
FIG. 2 is an enlarged vertical sectional view taken substantially along the line 2-2 of FIG. 1.

Referring now to the drawings, FIG. 1 shows a complete bar shear unit comprising bar shear apparatus 10, a pump and pump motor housing represented at 12, and an electrical enclosure 14, the foregoing components being mounted on a stand or support 16. The shear apparatus 10 includes a pair of shear blocks 18 and 20 (best shown in FIG. 2) which are supported in parallel face-to-face relation on top of a support plate 22. A retainer bar 24 is bolted to an upper mounting block 26 and is engageable against the upper outside surface of the shear block 18, and a similar retainer bar 28 is bolted to a lower mounting block 30 and is engageable against the lower outside surface of the shear block 18. It will be understood that the retainer bars 24 and 28 maintain the shear block 18 in position as shown in FIG. 2 in face-to-face relation with the shear block 20. In a similar manner, a pair of upper and lower retainer bars 32 and 34 are bolted to the upper and lower mounting blocks 26 and 30 and engage against the outside face of the shear block 20 at the upper and lower edges thereof to retain the latter in the upright position shown.

Figure 3:
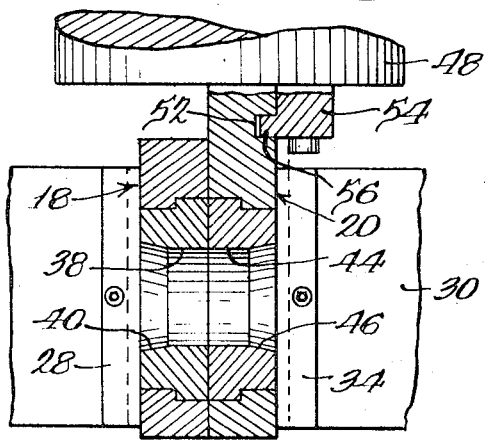
FIG. 3 is a horizontal sectional view taken substantially along the line 3-3 of FIG. 2.

It will be seen that the shear block 18 includes a hardened insert 36 having a central bore 38 formed therein having a beveled outer portion 40. Similarly, the corresponding shear block 20 includes a hardened insert 42 having a bore 44 formed therein with a beveled outer portion 46. Bar stock to be sheared is shown in dash lines at S, and it will be seen that the length of bar stock S is passed through the aligned openings 38 and 44. In order to effect a shearing operation the shear block 20 is moved horizontally transverse to the bar stock S, while the shear block member 18 remains stationary. Movement of the shear block 20 is accomplished by means of a hydraulically actuated ram 48 which moves in a cylinder 50 as shown in FIG. 1. The power stroke of the ram 48 is to the left as viewed in FIG. 1, and it will be seen from FIG. 3 that the opposite shear block 18 is spaced sufficiently from the end of the ram so that it is not engaged by the ram during the stroke of the latter. Thus, as the ram 48 moves out of the cylinder 50, it pushes on the rear end of the shear block 20 so as to force the latter through a predetermined stroke, thereby effecting shearing of the bar stock S.

The shear block 20 has a transverse groove 52 (see FIG. 3) formed in its outer face near the rear end thereof. If desired, the groove 52 may extend for the full width of the shear block member. A retainer member 54 is bolted to the forward end of the ram 48 and is formed with a key or tongue 56 which projects radially inwardly into the groove 52. Because the ram 48 directly abuts the rear end of the shear block 20, the ram when moving on its forward power stroke pushes the rear of the block 20 without any appreciable force being transmitted through the retainer 54. However, it will be noted that during the return stroke of the ram 48 the retainer 54 will act through the key 56 and groove 52 and cause the ram to pull the shear block 20 back to its original position.

With reference to the foregoing, it is important to note that when it is desired to change the shear blocks 18 and 20 to another set of a different size in order to shear bar stock material of a different diameter, it is a relatively simple matter to make such a change. The retainer plates 24 and 28 are removed from the mounting blocks 26 and 30, and the stationary block 18 may then be removed. Thereafter, the movable shear block 20 may be released by simply moving the same a short distance away from the retainer 54 so as to separate the key 56 from the groove 52. The shear block 20 may then be removed without disconnecting the retainer 54 from the end of the ram 48 and without disconnecting the retainer bars 32 and 34. A new shear block 20 may then be inserted in operative position with the key projecting into the groove 52; a new stationary shear block 18 is then positioned in face-to-face relation with the shear block 201 and the retainer bars 24 and 28 may then be replaced. With the foregoing arrangement, it is possible to replace a set of the shear blocks in only a small fraction of the time which is required where the movable shear block member is bolted to the end of the ram member.

Reference is now made to FIG. 4 which shows the hydraulic circuit for the bar shear apparatus of the present invention. There is shown a pump motor 60, and a pump 62, the latter being capable of producing 3000 p.s.i. oil pressure. A line 64 leads from the pump 62 and is connected with a relief valve 66 which is set for 3000 p.s.i. pressure so as to prevent any greater pressure from being developed in the hydraulic system. A needle valve 68 and a pressure gage 70 are also connected with the line 64.

The hydraulic system is shown in FIG. 4 in its normal idling position, and it will be seen that oil supplied under pressure form the pump 62 is conducted through the line 64 through a two-position hydraulically controlled valve 72 to the right hand side of the cylinder 50 thereby urging the ram piston 48' and ram 48 to the left or to its retracted position. A relief valve 74 is connected with the line 64 immediately before the latter communicates with the right hand side of the cylinder 50. The relief valve 74 is set for a suitable pressure such as 400 p.s.i. thereby regulating the pressure which is applied to return the ram 48 and maintain the same in its retracted position. A line 76 extends from the relief valve 74 to a junction 78 at which location the line is connected with a relief valve 80 which is set for a suitable reduced pressure such as 100 p.s.i. The relief valve 80 leads to a heat exchanger 82 which cools the oil, and a line 84 leads from the heat exchanger to a reservoir 86. From the junction 78, a line connects with a pilot line 90 which leads through a solenoid valve 92 and then through a line 94 to a hydraulic valve control member 96. It will thus be seen that oil at a pressure of 100 p.s.i. is supplied to the hydraulic member 96 and the latter in turn maintains the hydraulically controlled valve 72 in its left-hand or idling position as shown in FIG. 4.

A spring 98 is shown for biasing the solenoid valve 92 to its left-hand position, and there is provided a solenoid 100 which when energized will move the valve 92 to its opposite right-hand position. When the valve 92 is thus moved to its right-hand position, it will be understood that oil at a pressure of 100 p.s.i. in the pilot line 90 will be directed by the valve 92 to a line 102 which leads to a hydraulic valve control member 104, and the valve 72 will thereby be shifted to its right-hand position. Consequently, the oil at 3000 p.s.i. delivered to the line 64 from the pump 62 will now be conducted through the valve 72 to a line 106 which leads to the left side of the cylinder 50. Thus, the piston 48' and ram 48 will be moved to the right as viewed in FIG. 4 through a power stroke so as to effect a shearing operation. Furthermore, when the solenoid 100 is subsequently deenergized, the valve 92 and the valve 72 will be returned to their idling positions and oil at the reduced pressure of 400 p.s.i. will again be supplied to the right side of the cylinder 50 to stop the power stroke of the ram 48 and return the same to its retracted position.

I will now describe the electrical means for controlling the energization of the solenoid 100, and for this purpose reference is made to the schematic wiring diagram of FIG. 5. There is shown a power supply 108 connected through lines 110, 112 and 114 to the pump motor 60, and a transformer 116 is provided to step down the voltage to 110 volts. The portion of the electrical circuit enclosed within the dash outline 118 is essentially a starter for the pump motor 60. There is further provided a push button start switch 120, a limit switch 122, and a relay 124. The push button switch 120 permits manual starting of a shear cycle at any desired time. The limit switch 122 on the other hand is adapted to be positioned for engagement by the end of a length of bar stock S when the latter has been passed through the shear blocks 18 and 20 and is in a position to be sheared. Thus, when the bar stock S is in position to be sheared it trips the limit switch 122 and automatically initiates a shearing cycle.

When either the push button switch 120 or the limit switch 122 is closed, current is supplied to the relay 124 which closes a contact 124b thereby providing a holding circuit through a line 126 to the relay 124 so that the latter will remain energized even though both switches 120 and 122 are subsequently opened. Energization of the relay 124 also closes a contact 124a thus initiating operation of a timer 128. It is also important to note that when a circuit is completed through the contact 124b, current will be supplied to the solenoid 100 to energize the latter, and as described hereinabove, energization of the solenoid 100 initiates movement of the ram 48 through its power stroke for purposes of a shearing operation.

It will be understood from the foregoing that as long as the solenoid 100 is energized the ram 48 will move outwardly through a power stroke. The timer 128 is set for a predetermined amount of time, and when that time runs out a timer relay 130 opens a contact 130s thereby opening the circuit and deenergizing the solenoid 100. Consequently, when the timer 128 runs out of time, the ram 48 stops its forward movement and begins to return to its retracted position. A potentiometer 132 is connected with the timer 128 for setting the desired amount of time into the timer. In accordance with the present invention, it is preferred to locate the potentiometer 132 remote from the timer housing so that the potentiometer and also the push button start switch 120 may be located at a position most accessible for use by an operator of the bar shear apparatus.

By way of example of a preferred embodiment, and without intending in any way to limit the present invention, the pump 62 has a capacity of 27 gallons per minute rated on the basis of 1800 r.p.m. The cylinder 50 is 14 inches in diameter, and thus pump capacity may be expressed at 6250 cubic inches per minute. Assuming the hydraulic system is 95 percent efficient, and assuming the actual r.p.m. of the motor 60 is 1725 r.p.m. the speed of the ram 48 can be computed as approximately 37 inches per minute. Consequently, if the bar stock S were 4½ inches in diameter, and it were desired to provide a stroke of 1.5 inches for the ram 48, the timer 128 would be set for 2.43 seconds. In other words, the stroke of the ram 48 may be accurately controlled simply by setting the dial of the potentiometer 132, thereby putting a predetermined amount of time into the timer 128. Such control of the stroke of the ram 48 is a great deal easier to adjust than where it is necessary to vary the position of a limit switch or the like, and it will of course be obvious that if desired the dial on the potentiometer 132 may be calibrated directly in inches of stroke.

While I have described my invention in certain preferred forms, I do not intend to be limited to such forms, except insofar as the appended claims are so limited, since modifications coming within the scope of my invention will be readily apparent to those skilled in the art, particularly with my disclosure before them.

I claim:

1. In bar apparatus for shearing metal bar stock and the like, said apparatus including a hydraulically actuated piston-cylinder assembly for driving a power ram member through a predetermined shearing stroke, the improvement comprising, in combination, pump means for supplying oil under pressure to said cylinder for moving said power ram in a predetermined direction, said oil being supplied to a first end of said cylinder to move said power ram through a shearing stroke and being supplied to a second end of said cylinder to return said power ram to its idling position, valve means between said pump means and said cylinder for directing said oil to a selected one of said cylinder ends, timing means, means for initiating operation of said timing means at the beginning of a shearing stroke, and valve control means responsive to said timing means for controlling said valve means, said valve means being moved to a first position to initiate movement of said power ram through a shearing stroke and said timing means being operative after a preselected time to actuate said valve control means and cause movement of said valve means to a second position thereby effecting a reversal of the movement of said power ram after movement of the latter through a predetermined shearing stroke.

2. The invention of claim 1 where said valve control means includes solenoid means, said solenoid means being energized upon the beginning of a shearing stroke, and said timing means serving to effect deenergization of said solenoid means a preselected time after the beginning of said shearing stroke.

3. The invention of claim 1 where said timing means includes a potentiometer for setting said preselected time, the setting of said potentiometer thereby determining the length of said shearing stroke.

4. The invention of claim 2 including an electrical start switch, said start switch serving to effect energization of said solenoid while simultaneously initiating the operation of said timing means.

5. The invention of claim 1 where said valve means comprises a two-position hydraulically controlled valve, and said valve control means including second valve means for directing a portion of said oil to a selected side of said hydraulically controlled valve to control the position thereof.

6. The invention of claim 5 where said valve control means further includes solenoid means, said solenoid means being energized upon the beginning of a shearing stroke, and said timing means serving to effect deenergization of said solenoid means a preselected time after the beginning of said shearing stroke, said solenoid means being connected with said second valve means for controlling the position of the latter.

7. In bar shear apparatus for shearing metal bar stock and the like, said apparatus including a hydraulically actuated piston-cylinder assembly for driving a power ram member through a predetermined shearing stroke, the improvement comprising, in combination, pump means for supplying oil under pressure to said cylinder for moving said power ram in a predetermined direction, said oil being supplied to a first end of said cylinder to move said power ram through a shearing stroke and being supplied to a second end of said cylinder to return said power ram to its idling position, first valve means comprising a two-position hydraulically controlled valve between said pump means and said cylinder for directing said oil to a selected one of said cylinder ends, second valve means for directing a portion of said oil to a selected side of said first valve means to control the position thereof, solenoid means connected to said second valve means to control the position of the latter, timing means, an electrical start switch for effecting energization of said solenoid means while simultaneously initiating the operation of said timing means, said solenoid means thus being energized upon the beginning of a shearing stroke and said timing means serving to effect deenergization of said solenoid means a preselected time after the beginning of said shearing stroke, said first valve means thus being moved to a first position to initiate movement of said power ram through a shearing stroke and said timing means being operative after a preselected time to deenergize said solenoid means and effect movement of said first valve means to a second position thereby causing a reversal of the movement of said power ram after movement of the latter through a predetermined shearing stroke.